United States Patent
Bodunov et al.

[15] 3,704,076
[45] Nov. 28, 1972

[54] SCREW FEEDER FOR PASTE-LIKE MATERIALS

[72] Inventors: Igor Vasilievich Bodunov; Boris Sergeevich Modestov; Viktor Vasilievich Ivanchenko, all of Severodonetsk Voroshilovgradskoi oblasti, U.S.S.R.

[73] Assignee: Severodonetsky Filial Niihimmash, Severodonetsk Voroshilovgradskoi oblasti, U.S.S.R.

[22] Filed: Dec. 16, 1970

[21] Appl. No.: 98,760

[52] U.S. Cl. ............415/72, 18/12, 198/213, 222/413, 259/6, 259/105
[51] Int. Cl. .................................................F01d 5/00
[58] Field of Search ..............415/72, 73; 259/6, 105; 222/413; 198/213; 18/12

[56] References Cited

UNITED STATES PATENTS 3,580,389    5/1971    Nonnenmacher .........198/213
2,641,369    6/1953    Mulcey et al. .............198/213
3,288,077    11/1966   Meskat .....................198/213

FOREIGN PATENTS OR APPLICATIONS 920,138    3/1963    Great Britain...............415/74
98,369     5/1961    Norway.....................222/413

Primary Examiner—C. J. Husar
Attorney—Waters, Roditi, Schwartz & Nissen

[57] ABSTRACT

A screw feeder used for batching paste-like materials, having batching and charging chambers, the batching chamber accommodating a screw conveyor used to displace the material and having a cylindrical spiral eccentrically secured thereto, the turns of the spiral being disposed inbetween the tunrs of the lower portion of the screw conveyor and, in the course of rotation, cleaning the screw conveyor of the material adhered thereto.

2 Claims, 2 Drawing Figures

PATENTED NOV 28 1972 3,704,076

SCREW FEEDER FOR PASTE-LIKE MATERIALS

The present invention realtes to screw feeders used for batching paste-like materials, such as varnish, color, catalyst, etc.

There are well-known screw feeders for paste-like materials, comprising a housing having charging and batching chambers. Mounted in the charging chamber of the housing of the feeder are Z-shaped rotary blades to supply the paste-like material into the batching chamber accommodating a screw conveyor to which rotation is imparted to displace the material.

The blades and the screw conveyor are rotated by an electric motor via a reducing gear and a distributor box.

Practice has shown that the conventional feeders are not reliable in operation as the paste-like material adheres to the working surface of the chamber and, consequently, is turned along with the screw conveyor. This results in a lower efficiency of the feeder and, sometimes, in complete discontinuation of the supply of the material fed by it.

The present invention has as its task the provision of a screw feeder for paste-like materials, wherein the screw conveyor is continuously cleaned in the course of its operation to prevent the material from being turned along with the screw.

This task is accomplished by a screw feeder for paste-like materials, comprising a housing having charging and batching chambers, the batching chamber accommodating a screw conveyor to which rotation is imparted to displace the material, in which screw feeder, in accordance with the present invention, the batching chamber has a cylindrical spiral mounted therein, rotating along with the screw conveyor and eccentrically embracing the screw conveyor in such a manner that its turns are disposed inbetween the turns of the lower portion of the screw conveyor, and, in the course of rotation, clean the latter of the material adhered thereto, the pitch of the spiral equalling that of the screw conveyor.

In the screw feeder according to the present invention the angular speeds of the screw conveyor and the spiral are maintained in a preset ratio by means of a distributor box, in which the shaft of the screw conveyor serves as an input shaft and the spiral serves as an output shaft.

In the screw feeder according to the present invention the working face of the screw conveyor is continuously cleaned of the paste-like material adhered thereto by means of the rotating cylindrical spiral, which considerably raises the efficiency of the feeder and completely precludes the possibility of the discontinuation of the supply of the material fed by it.

To make the subject-matter of the present invention readily understood, the following detailed description thereof is given with reference to the accompanying drawings, in which.

Figures 1, 2:
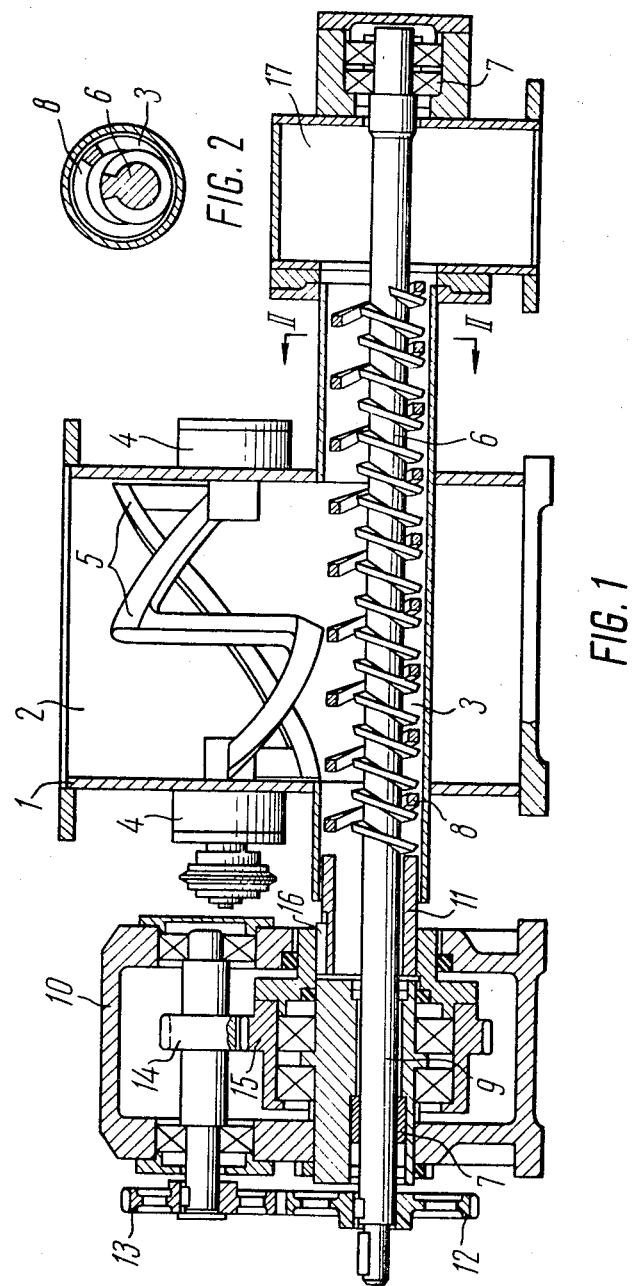
FIG. 1 shows a longitudinal section of a screw feeder according to the present invention.
FIG. 2 is a section taken along line II—II OF FIG. 1.

A screw feeder for paste-like materials comprises a housing 1 (FIGS. 1, 2) having charging chamber 2 and cylindrical batching chamber 3.

The charging chamber 2 has Z-shaped blast blades 5 mounted in bearing supports 4 and used for delivering the material from the charging chamber 2 into the batching chamber 3.

Mounted under the blast blades 5 in the batching chamber 3 is a screw conveyor 6 used for supplying the material and rotating in bearings 7. The batching chamber 3 also accommodates a tubular member 8 formed with scraping helical turns at one end thereof, 8 eccentrically embraces the screw conveyor 6 in such a manner that the turns of the spiral 8 are disposed inbetween the turns of the lower portion of the screw conveyor 6.

The pitch of the scraping helical turns 8 is equal to that of the screw conveyor 6, and the direction of the screw line of the screw conveyor 6 is the same as that of the scraping helical turns 8.

The scraping helical turns 8 is disposed concentrically relative to the batching chamber 3.

A shaft 9 of the screw conveyor 6 is passed through a distributor box 10 which is essentially a double-stepped cylindrical wheel gear, and serves as its input shaft.

The tubular member having the scraping helical turns 8 is rotated by the input shaft 9 of the distributor box 10 through the intermediary of toothed wheels 12, 13, 14 and the driving connection established between the toothed wheel 15 and the other end 11 of the tubular member 8 through the key 16.

Mounted at the point where the material comes off the screw conveyor 6 is a discharging chamber 17.

The screw conveyor 6, the tubular member 8 and the blades 5 are rotated synchronously by a common drive (not shown in the drawing).

The paste-like material supplied into the charging chamber 2 is delivered by the Z-shaped blast blades 5 into the batching chamber 3. The screw conveyor 6 and the tubular member 8, which are synchronously rotated by a drive (not shown in the drawing) through the intermediary of the distributor box 10, displace the material in the direction of the discharging chamber 17.

Since the turns of the tubular member 8 are disposed inbetween the turns of the screw conveyor 6, they are mutually cleaned of the material adhering thereto in the course of operation of the screw feeder.

One and the same direction of rotation of the screw conveyor 6 and the tubular member 8 and a preset ratio of their angular speeds, which is inversely proportional to their pitches, are provided by the distributor box 10.

We claim:

1. A screw feeder for paste-like material comprising: a housing having a charging chamber and a batching chamber; a rotatable screw conveyor having material displacing threads disposed in said batching chamber for displacing said material; a tubular member extending through said batching chamber and eccentrically receiving said screw conveyor, said tubular member being rotatable at an angular speed which is a multiple of the annular speed of said screw conveyor; scraping helical turns, formed on said tubular member and extending longitudinally substantially along the entire length thereof and being disposed between said material displacing threads of the screw conveyor in the lower portion thereof for cleaning from the displacing threads material adhering thereto during the course of rotation, said scraping helical turns having a pitch corresponding to the pitch of said material displacing threads; and means for synchronously rotating said screw conveyor and said tubular member.

2. The screw feeder according to claim 1 wherein said screw conveyor and said tubular member having an angular speed relationship inversely proportioned to their respective pitches, and a distributor box for imparting the same direction of rotation to said screw conveyor and to said tubular member.

* * * * *